(12) United States Patent
Ito

(10) Patent No.: US 9,570,919 B2
(45) Date of Patent: Feb. 14, 2017

(54) POWER TRANSMISSION DEVICE, POWER TRANSMISSION METHOD, AND STORAGE MEDIUM

(71) Applicant: CANON KABUSHIKI KAISHA, Tokyo (JP)

(72) Inventor: Takehiro Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 275 days.

(21) Appl. No.: 14/276,277

(22) Filed: May 13, 2014

(65) Prior Publication Data

US 2014/0344591 A1 Nov. 20, 2014

(30) Foreign Application Priority Data

May 14, 2013 (JP) ................. 2013-102424

(51) Int. Cl.
*G06F 1/26* (2006.01)
*H02J 5/00* (2016.01)
*H04B 5/00* (2006.01)
*H02J 7/02* (2016.01)
*H02J 7/00* (2006.01)

(52) U.S. Cl.
CPC ............. *H02J 5/005* (2013.01); *H04B 5/0037* (2013.01); *H02J 7/025* (2013.01); *H02J 2007/0001* (2013.01)

(58) Field of Classification Search
CPC ............ H04L 9/14; H04L 9/06; H04B 5/0037; H02J 5/005; H02J 7/025; H02J 2007/0001
See application file for complete search history.

(56) References Cited

U.S. PATENT DOCUMENTS

2009/0325651 A1  12/2009  Kondo
2011/0136550 A1*  6/2011  Maugars ................. H02J 7/025
                                                            455/573

FOREIGN PATENT DOCUMENTS

| CN | 101098554 A | 1/2008 |
| CN | 101243591 A | 8/2008 |
| CN | 102457109 A | 5/2012 |
| CN | 102684315 A | 9/2012 |
| JP | 2009-136132 A | 6/2009 |

* cited by examiner

*Primary Examiner* — Thuan Du
(74) *Attorney, Agent, or Firm* — Canon U.S.A., Inc. IP Division

(57) ABSTRACT

A power transmission device includes a reception unit configured to receive, from each of a plurality of power reception devices as power transmission objects, identification information for identification of the power reception device, a device determination unit configured to determine, based on the identification information, whether each of the power reception devices is a registered device that has been registered beforehand, and a power transmission unit configured to transmit power to the registered device.

5 Claims, 10 Drawing Sheets

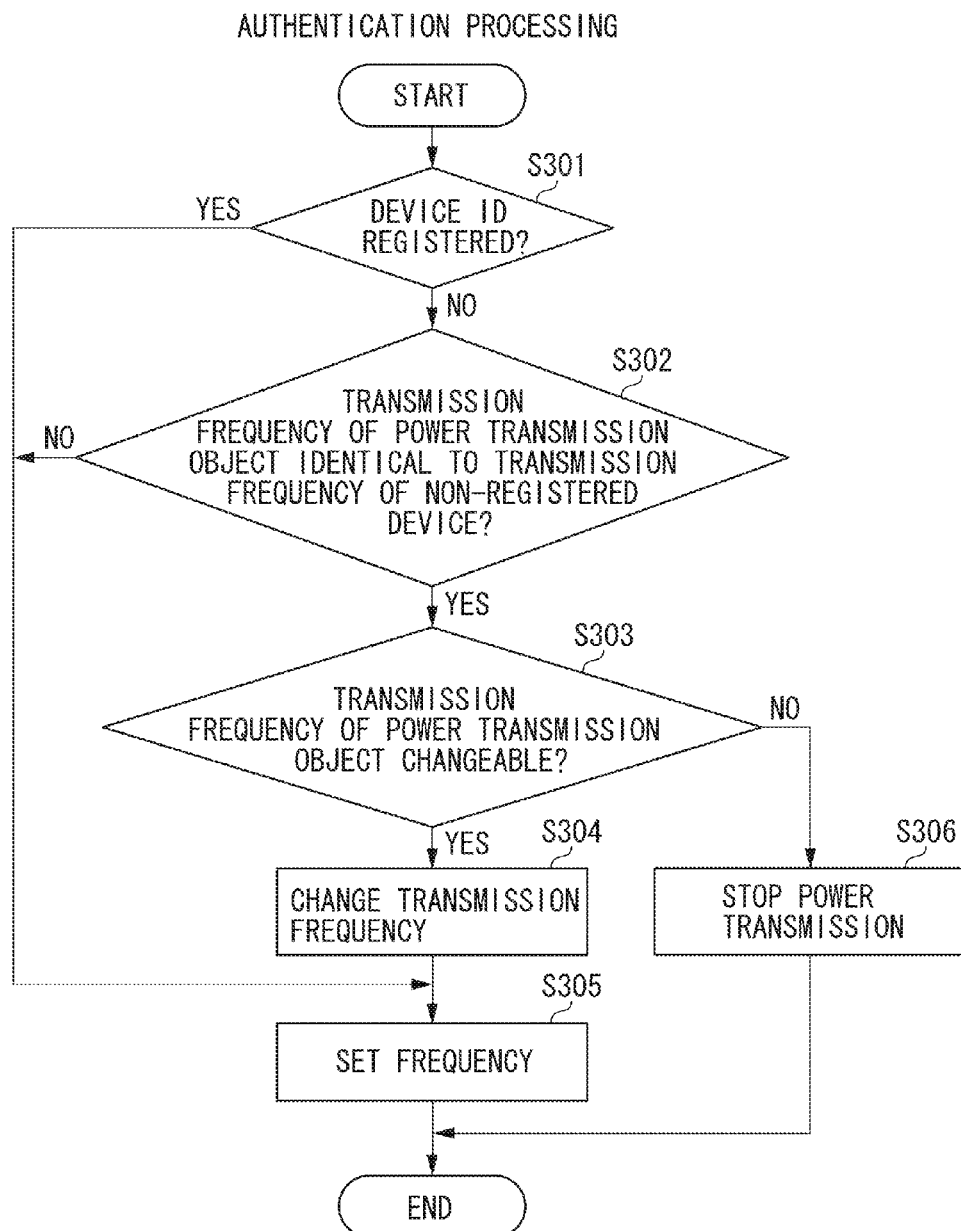

POWER TRANSMISSION DEVICE, POWER TRANSMISSION METHOD, AND STORAGE MEDIUM

BACKGROUND

Field

Aspects of the present invention generally relate to a power transmission device, a power transmission method, and a storage medium.

Description of the Related Art

Conventionally, a technique for supplying electric power in a contactless manner (by radio) has been known. As exemplary contactless power supply methods, the following four types are available: an electromagnetic induction type; a magnetic field resonance type; an electric field coupling type; and a radio wave reception type. Among these, the magnetic field resonance type is characterized in that sufficient electric power can be transmitted for a long distance, and therefore, the magnetic field resonance type has particularly attracted attention among the four types. Regarding the magnetic field resonance type, the one-to-N power supply method where a power transmission device performs power transmission to a plurality of reception devices by radio has been proposed, in which this characteristic of the long power transmission distance is taken advantage of (see, for example, Japanese Patent Application Laid-Open No. 2009-136132).

According to the technique discussed in Japanese Patent Application Laid-Open No. 2009-136132, a power transmission device performs search, by emitting a constant pulse signal in a stand-by mode when not performing power transmission, so as to determine whether any power reception device is present in the vicinities within several meters. Then, when a reception device sends its own unique ID to the power transmission device, the power transmission device determines whether a transmission source of the unique ID is a power reception device that is a power supply object. In a case where the transmission source is a power reception device that is a power supply object, the power transmission device supplies electric power to the power reception device. Here, the power transmission device can send a unique code to the power reception device, in order to receive information about the amount of charge, a state of the device, etc., individually.

The power transmission device performs power transmission at a transmission frequency at which the power reception device as a power transmission object can receive power. Here, however, any device that can receive power at a frequency that coincides with the transmission frequency can receive power, even if it is a device other than those that the power transmission device assumes as the power reception devices. This results in a problem that a third party may steal electric power.

SUMMARY OF THE INVENTION

Aspects of the present invention is generally directed to prevent electric power from being supplied to a device that is not assumed to be a power transmission object.

According to an aspect of the present invention, a power transmission device includes a reception unit configured to receive, from each of a plurality of power reception devices as power transmission objects, identification information for identification of the power reception device, a device determination unit configured to determine, based on the identification information, whether each of the power reception devices is a registered device that has been registered beforehand, and a power transmission unit configured to transmit power to the registered device.

Further features of the present disclosure will become apparent from the following description of exemplary embodiments with reference to the attached drawings.

BRIEF DESCRIPTION OF THE DRAWINGS

FIG. 10 is a flowchart illustrating authentication processing.

DESCRIPTION OF THE EMBODIMENTS

Various exemplary embodiments will be described in detail below with reference to the drawings.

Figure 1:
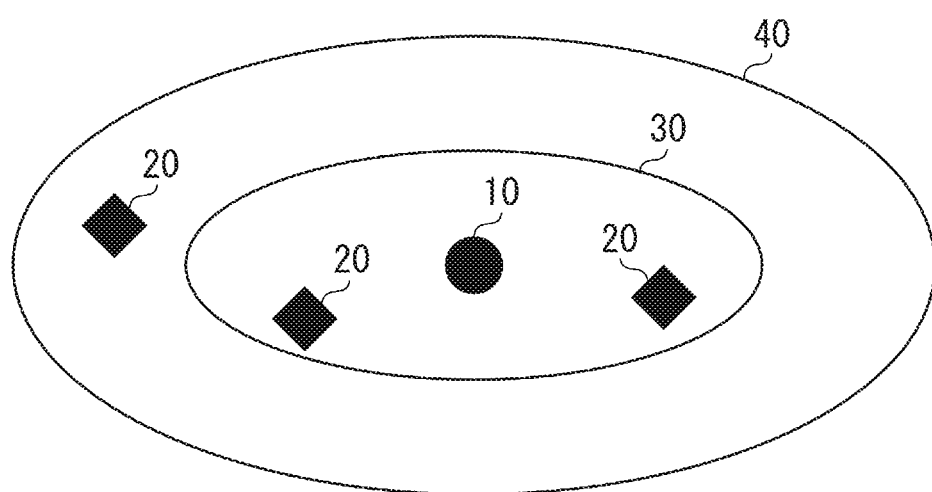
FIG. 1 illustrates a wireless power supply system.

FIG. 1 illustrates a wireless power supply system. The wireless power supply system includes a power transmission device 10 and a plurality of power reception devices 20. It should be noted that the wireless power supply system includes a plurality of power transmission devices 10, though FIG. 1 illustrates only one power transmission device 10. The power transmission device 10 supplies electric power to the power reception devices 20 by radio. Further, the power transmission device 10 performs data communication necessary for power supply, with the power reception devices 20. The power reception devices 20 receive electric power supplied by radio from the power transmission device 10. Further, the power reception devices 20 perform data communication necessary for power supply with the power transmission device 10.

A power supply area 30 illustrated in FIG. 1 is an area where power supply can be performed from the power transmission device 10 to the power reception devices 20. A communication area 40 is an area where data communication can be performed between the power transmission device 10 and the power reception devices 20.

The following describes the relationship between the power supply area 30 and the communication area 40. The power supply area 30 is smaller as compared with the communication area 40. More specifically, the power supply area 30 is included in the communication area 40. In a case where the plurality of power reception devices 20 is present in the power supply area 30 as illustrated in FIG. 1, the power transmission device 10 can perform wireless power supply to these power reception devices 20 in parallel.

It should be noted that, though the power supply area 30 indicated by a solid line circle and the communication area 40 indicated by a solid line circle are illustrated two-dimensionally in FIG. 1 for convenience sake, they are actually steric (three-dimensional) areas.

Figure 2:
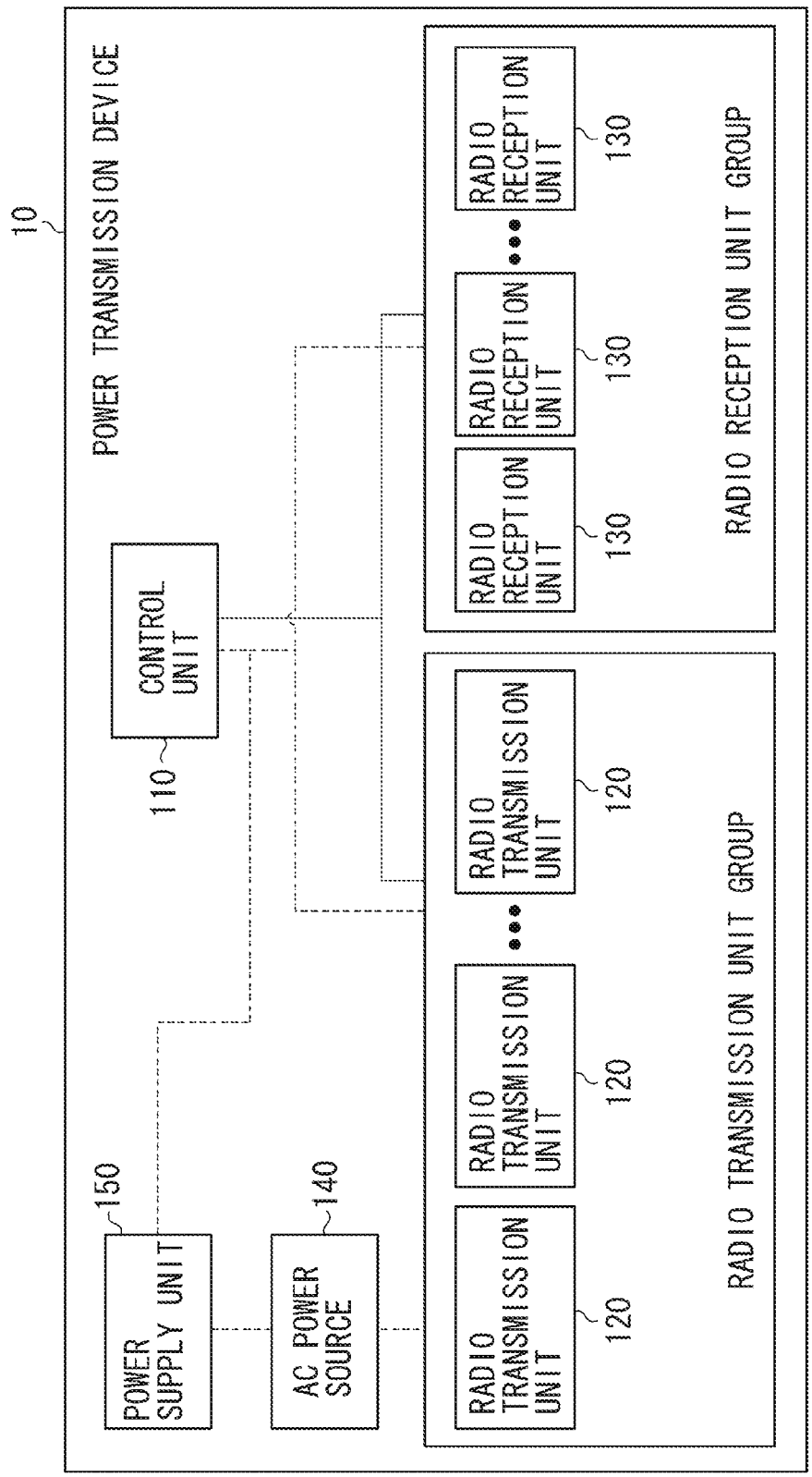
FIG. 2 illustrates a power transmission device.
Figure 3:
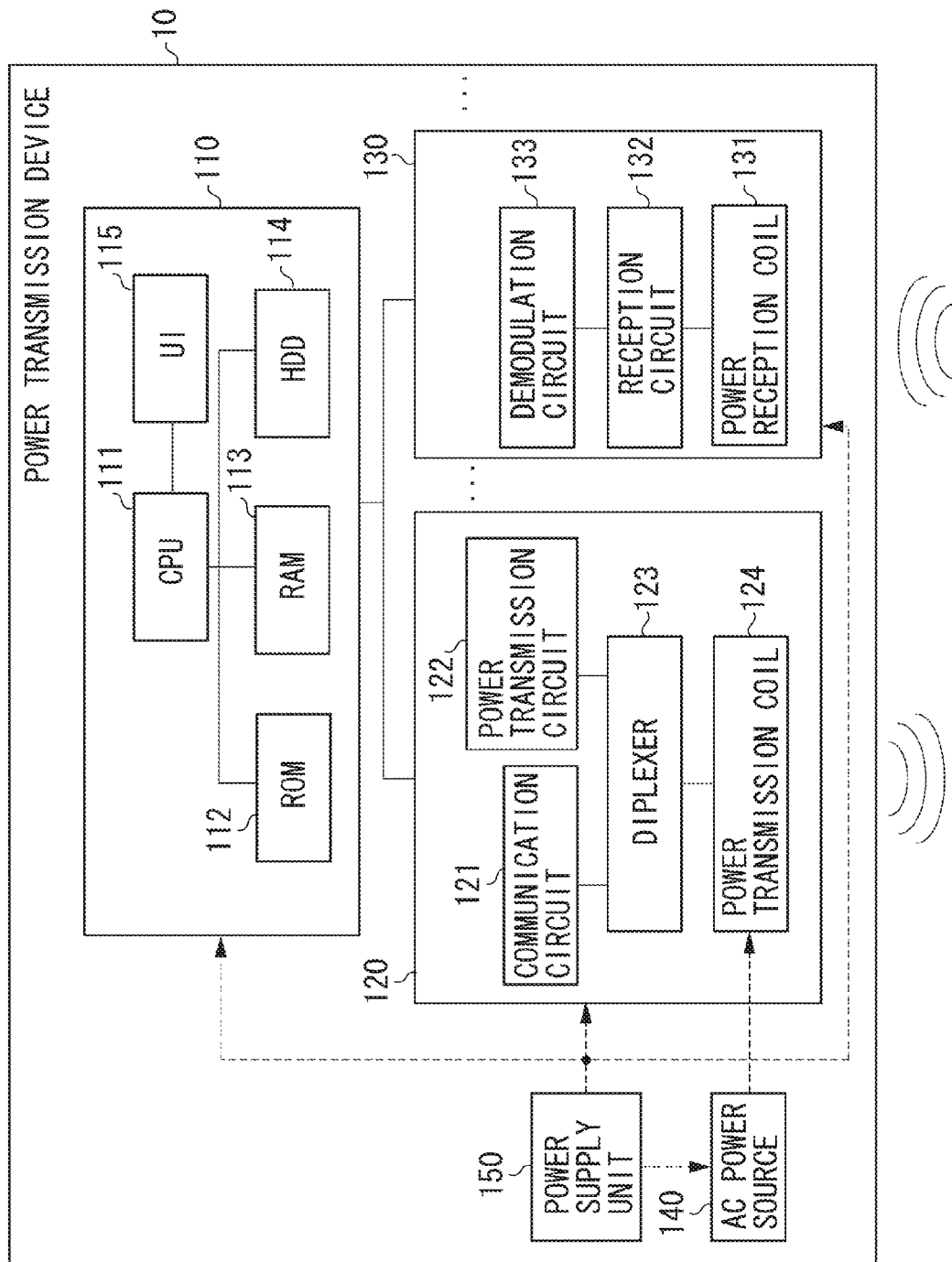
FIG. 3 illustrates a power transmission device.

FIGS. 2 and 3 illustrate a configuration of the power transmission device. It should be noted that in FIGS. 2 and 3, exchange of data is indicated with solid lines, and supply of electric power is indicated with dotted lines. As illustrated in FIG. 2, the power transmission device 10 includes a control unit 110, a plurality of radio transmission units 120, a plurality of radio reception units 130, an AC power source 140, and a power supply unit 150.

The control unit 110 controls the entire power transmission device 10. The radio transmission units 120 receive AC power supplied from the AC power source 140, and transmits electric power to the power reception devices 20 by radio. For the radio transmission units 120, transmission frequencies for transmission of electric power, which are different from one another, are set, respectively. The radio reception units 130 receive data from the power reception devices 20. For the radio reception units 130, transmission frequencies for reception of electric power, which are different from one another, are set, respectively. Thus, the power transmission device 10, which includes the plurality of radio transmission units 120, therefore can transmit power to the plurality of power reception devices 20 simultaneously.

As illustrated in FIG. 3, the control unit 110 includes a central processing unit (CPU) 111, a read-only memory (ROM) 112, a random access memory (RAM) 113, a hard disk drive (HDD) 114, and a user interface (UI) 115. The control unit 110 is connected to the radio transmission units 120 and the radio reception units 130 via internal buses.

The CPU 111 processes a variety of data so as to control the power transmission device 10. The ROM 112 is a non-volatile storage medium, and stores a boot program, etc., that the CPU 111 uses. The RAM 113 is a volatile storage medium, and temporarily stores data, programs, etc., that the CPU 111 uses. The HDD 114 is a non-volatile storage medium, and stores operation systems, applications, etc., that the CPU 111 uses. The UI 115 displays a various types of information to a user, and receives a variety of instructions from the user.

Each radio transmission unit 120 includes a communication circuit 121, a power transmission circuit 122, a diplexer 123, and a power transmission coil 124. The communication circuit 121 generates a modulation signal for communication. The power transmission circuit 122 generates a modulation signal for transmission of electric power.

The diplexer 123 synthesizes the modulation signal generated by the communication circuit 121 and the modulation signal generated by the power transmission circuit 122. The power transmission coil 124 transmits the modulation signal synthesized by the diplexer 123 to the power reception devices 20.

Each radio reception unit 130 includes a power reception coil 131, a reception circuit 132, and a demodulation circuit 133. The power reception coil 131 receives modulation signals for communication from the power reception devices 20. The reception circuit 132 receives the modulation signal received by the power reception coil 131. The demodulation circuit 133 demodulates the modulation signal received by the reception circuit 132.

The AC power source 140 supplies an AC voltage to the power transmission coil 124 and the power supply unit 150. The power supply unit 150 converts the AC voltage supplied by the AC power source 140 into a DC voltage, and supplies the DC voltage to the control unit 110, the radio transmission unit 120, and the radio reception unit 130.

It should be noted that the function of the power transmission device 10 and the processing by the same, which are to be described below, are realized by the CPU 111 reading a program stored in the ROM 112 or the HDD 114 and executing the program.

Figure 4:
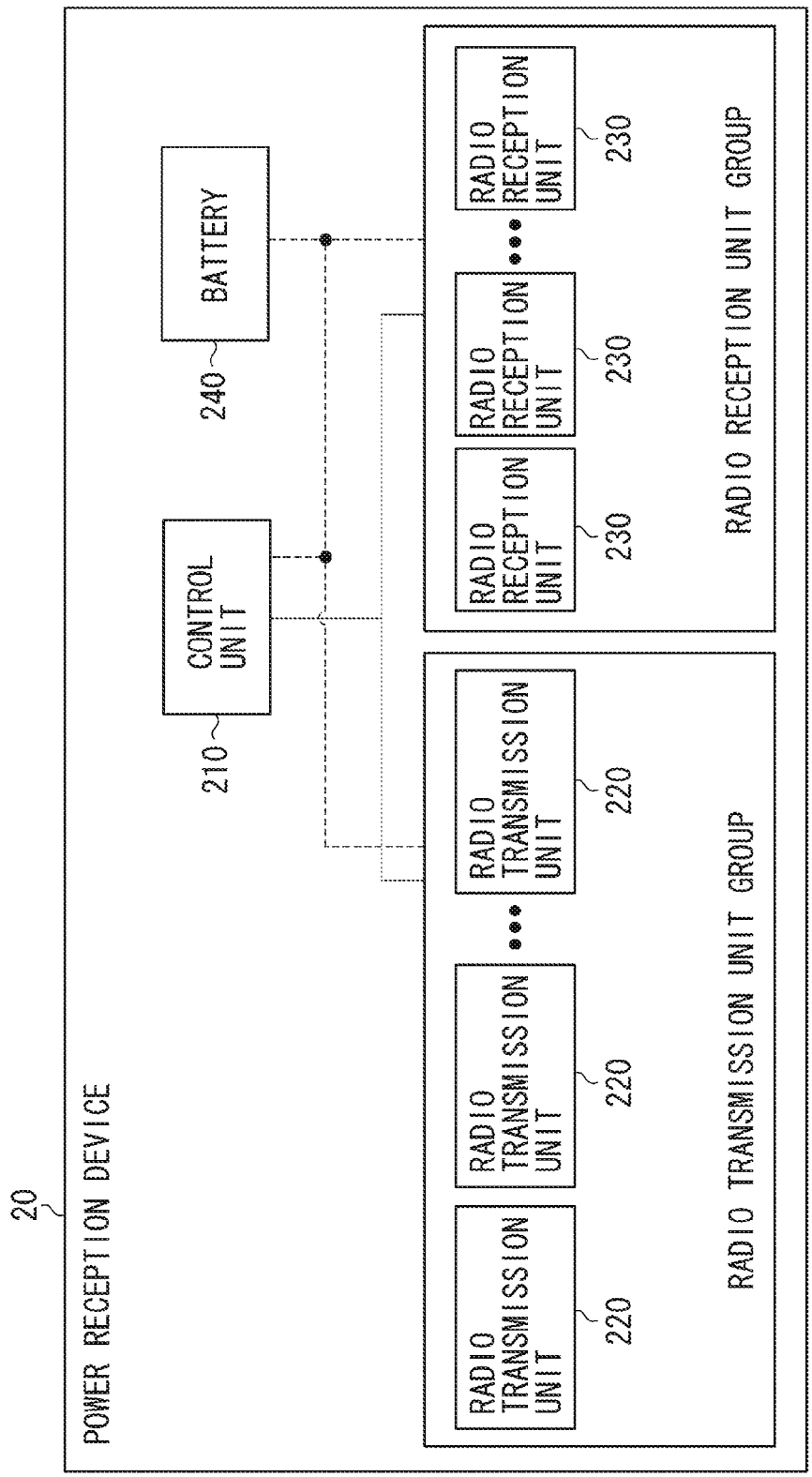
FIG. 4 illustrates a power reception device.
Figure 5:
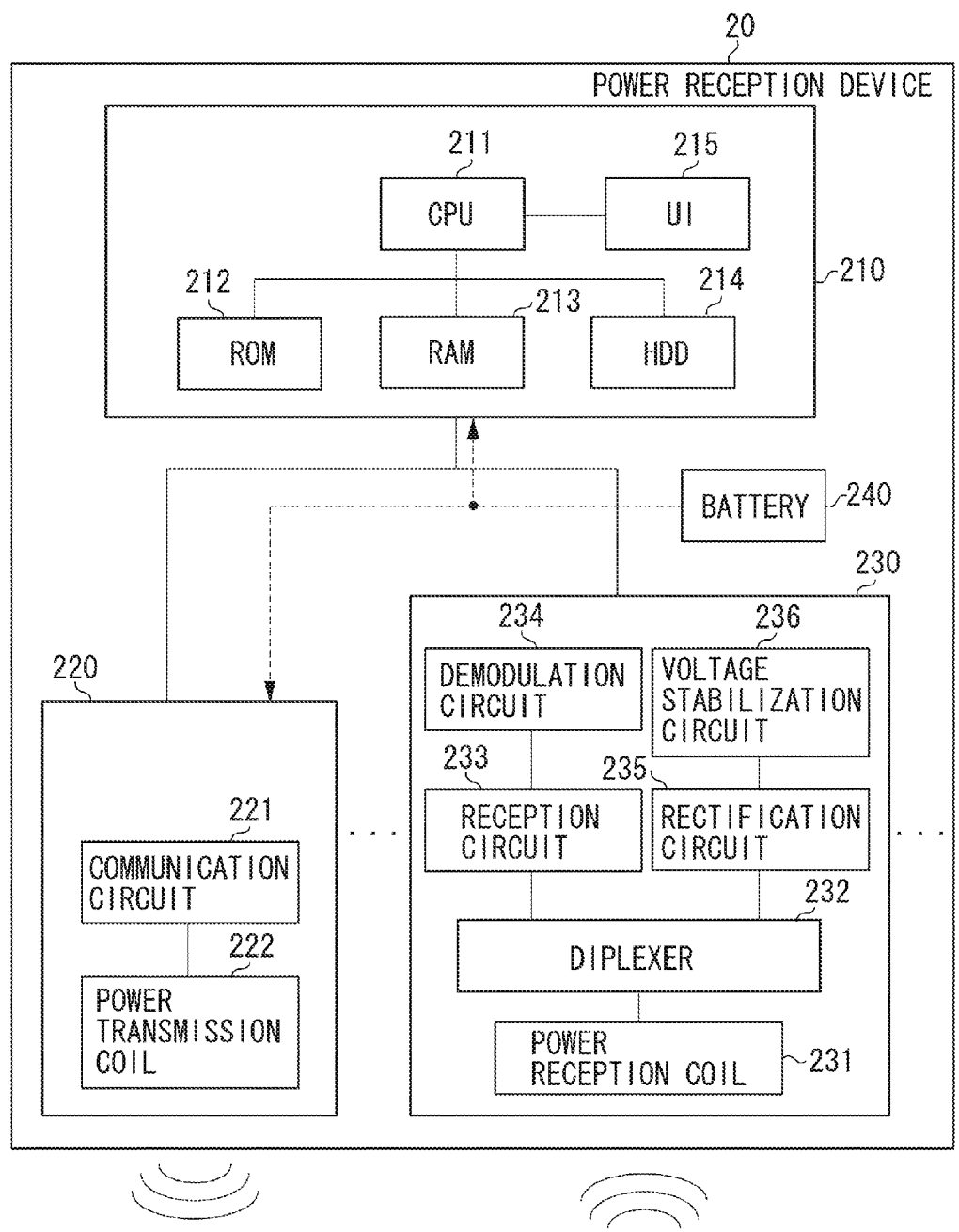
FIG. 5 illustrates a power reception device.

FIGS. 4 and 5 illustrate the power reception device 20. In FIGS. 4 and 5, exchange of data is indicated with solid lines, and supply of electric power is indicated with dotted lines.

As illustrated in FIG. 4, the power reception device 20 includes a control unit 210, a plurality of radio transmission units 220, a plurality of radio reception units 230, and a battery 240.

The control unit 210 controls the power reception device 20. The radio transmission unit 220 transmits data to the power transmission device 10. Further, for the radio transmission units 220, transmission frequencies for transmission of electric power, which are different from one another, are set, respectively. The radio reception unit 230 receives electric power by radio from the power transmission device 10. Further, for the radio reception units 230, transmission frequencies for reception of electric power, which are different from one another, are set, respectively.

The battery 240 accumulates electric power. The battery 240 also supplies a DC voltage to the control unit 210, the radio transmission units 220, and the radio reception unit 230, based on the accumulated electric power.

As illustrated in FIG. 5, the control unit 210 includes a CPU 211, a ROM 212, a RAM 213, an HDD 214, and a UI 215. The control unit 210 is connected to the radio transmission unit 220 and the radio reception unit 230 via internal buses.

The CPU 211 processes a variety of data, so as to control the power reception device 20. The ROM 212 is a non-volatile storage medium, and stores a boot program, etc., that the CPU 211 uses. The RAM 213 is a volatile storage medium, and temporarily stores data, programs, etc. that the CPU 211 uses. The HDD 214 is a non-volatile storage medium, and stores operation systems, applications, etc., that the CPU 211 uses. The UI 215 displays a various types of information to a user, and receives a variety of instructions from the user.

Each radio transmission unit 220 includes a communication circuit 221 and a power transmission coil 222. The communication circuit 221 generates a modulation signal for communication. The power transmission coil 222 transmits the modulation signal generated by the communication circuit 221 to the power transmission device 10.

Each radio reception unit 230 includes a power reception coil 231, a diplexer 232, a reception circuit 233, a demodulation circuit 234, a rectification circuit 235, and a voltage stabilization circuit 236. The power reception coil 231 receives the modulation signal from the power transmission device 10. The diplexer 232 divides the modulation signal received by the power reception coil 231, into a modulation signal for communication and a modulation signal for transmission of electric power. The reception circuit 233 receives the modulation signal for communication, which was obtained by division by the diplexer 232.

The demodulation circuit 234 demodulates the modulation signal of the reception circuit 233. The rectification circuit 235 rectifies the modulation signal obtained by division by the diplexer 232, which is for transmission of electric power, so as to generate a DC voltage. The voltage stabilization circuit 236 stabilizes the DC voltage generated by the rectification circuit 235. The battery 240 receives the voltage stabilized by the voltage stabilization circuit 236, and accumulates electric power.

It should be noted that the function of the power reception device 20 and the processing by the same, which are to be described below, are realized by the CPU 211 reading a program stored in the ROM 212 or the HDD 214 and executing the program.

Figure 6:
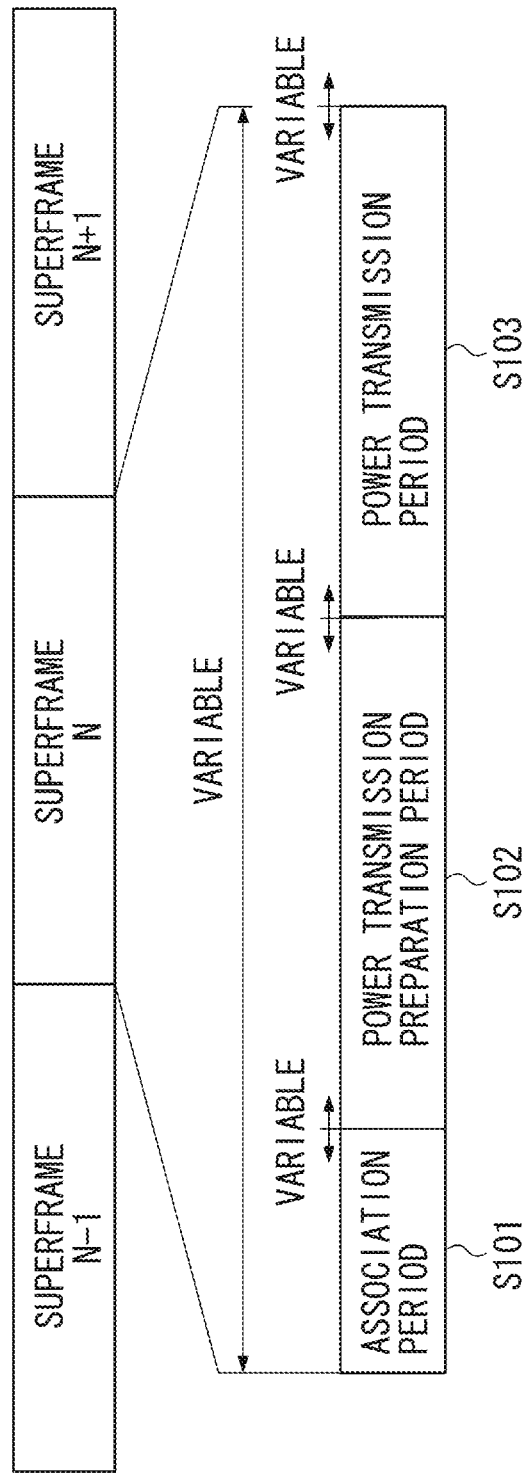
FIG. 6 illustrates an exemplary superframe.

FIG. 6 illustrates an exemplary superframe. The wireless power supply system according to the present embodiment performs wireless power supply processing by repeating such a superframe. One superframe includes S101 (association period), S102 (power transmission preparation period), and S103 (power transmission period). It should be noted that each period is variable.

In S101, the power transmission device 10 checks the power reception device 20 regarding a device ID thereof and a necessity of power. The device ID is identification information of the power reception device 20. When the power transmission device 10 receives, from the power reception device 20, the device ID thereof and the effect that the power reception device 20 needs electric power, transition is made to S102. It should be noted that the timing of transition from S101 to S102 is also variable.

In S102, the power reception device 20 can transmit a response or an acknowledgement of a frame in response to a data request of the power transmission device 10. It should be noted that respective lengths of the response frames and of the acknowledgement frames are variable. When S102 ends, transition is made to S103. It should be noted that the timing of transition from S102 to S103 is also variable.

In S103, the power transmission device 10 transmits electric power to the power reception device 20. In S103, the power reception device 20 can transmit a frame to the power transmission device 10, even without a request frame from the power transmission device 10.

Figure 7:
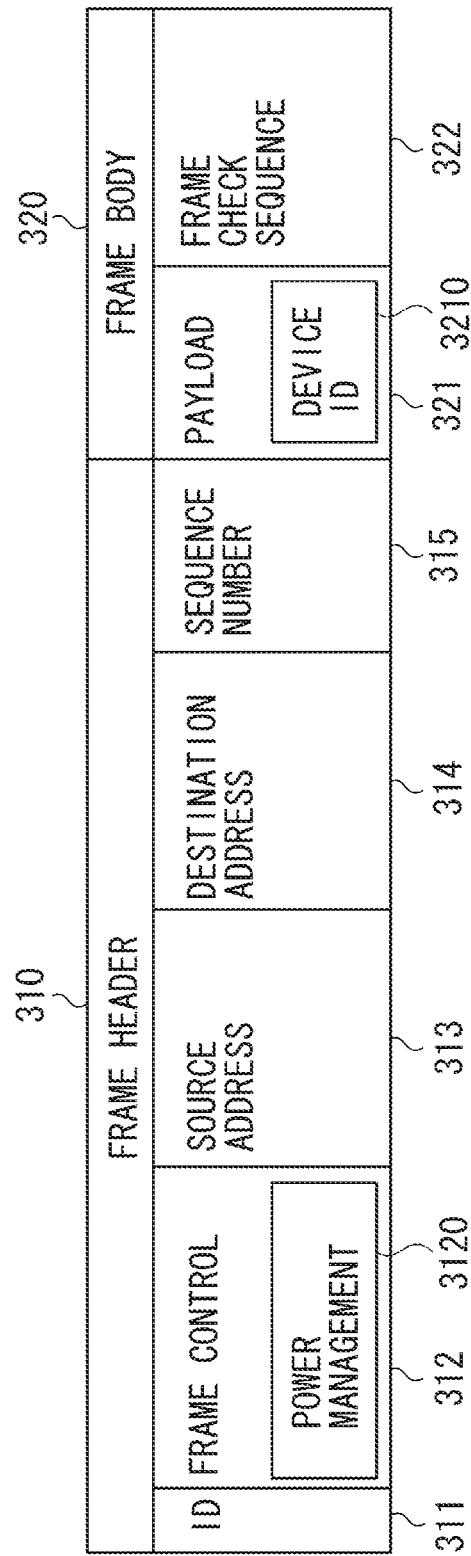
FIG. 7 illustrates an exemplary frame format.

FIG. 7 illustrates an exemplary frame format. In the above-described superframe, data communication using packets of a frame format as illustrated in FIG. 7 is achieved. By such data communication, transmission/reception of data necessary for starting wireless power supply is performed.

A frame header 310 indicates a destination and the like when data is transferred. The frame header 310 includes an identification (ID) 311, a frame control 312, a source address 313, a destination address 314, and a sequence number 315.

The ID 311 is used when the wireless power supply system performs data communication. The frame control 312 is information for data exchange of the power reception device 20. The frame control 312 includes a power management 3120. The power management 3120 is data for checking if power is needed. The source address 313 is an address of a transmission source upon the data transfer. The destination address 314 is an address of a destination upon the data transfer. The sequence number 315 is a frame number.

A frame body 320 is information of a data main body upon the data transfer. The frame body 320 includes a payload 321 and a frame check sequence 322. The payload 321 is a data main body. To the payload 321, for example, a device ID 3210, additional information, and the like are assigned. In a case where the power transmission device 10 is supplying power, the additional information contains at least information about resonant frequency currently in use. The frame check sequence 322 is data for error check of the payload 321.

Figure 8:
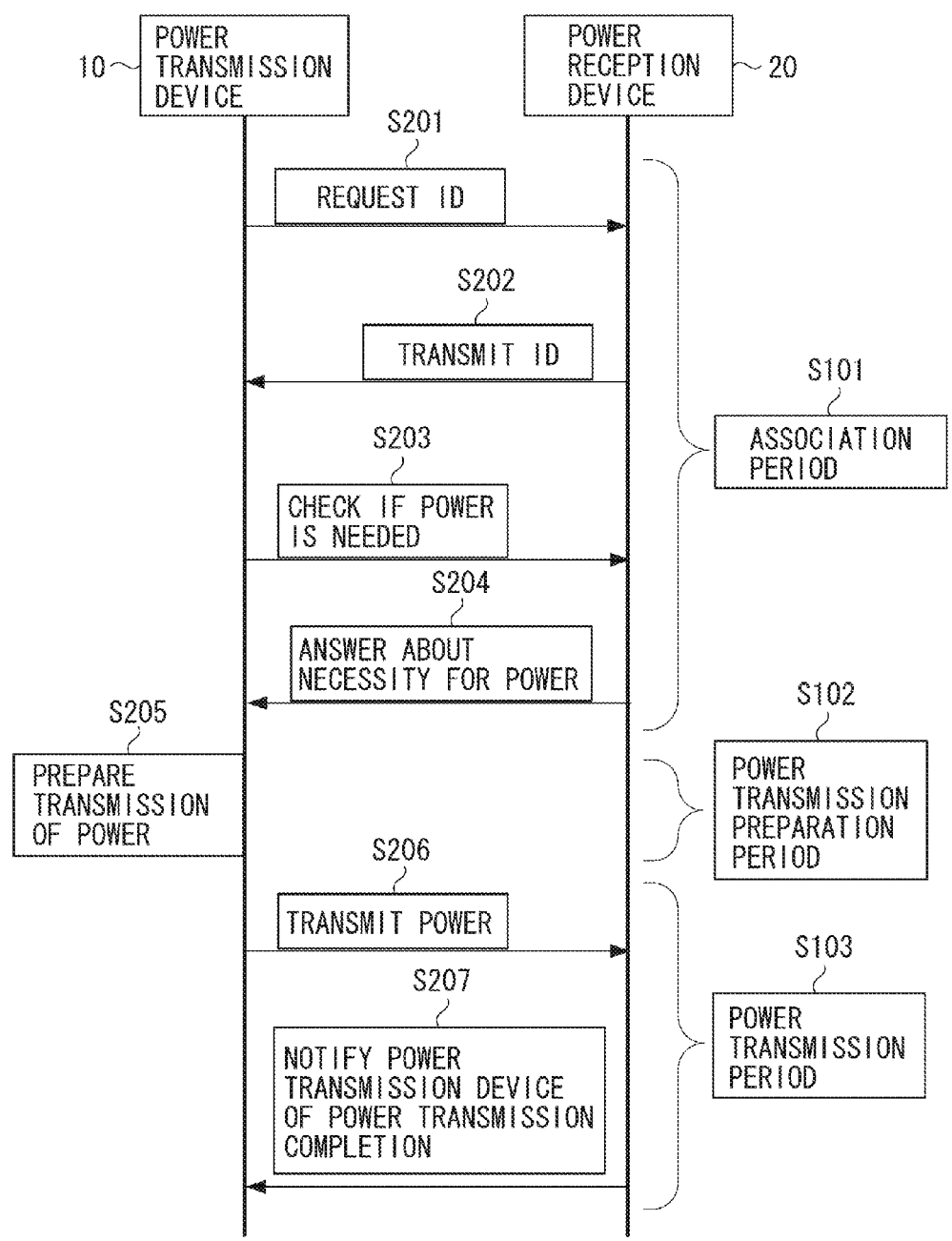
FIG. 8 is a sequence diagram illustrating data transmission/reception processing.

FIG. 8 is a sequence diagram that illustrates processing of data transmission/reception between the power transmission device 10 and the power reception device 20 in a superframe. In step S201, the power transmission device 10 transmits information for requesting a device ID of the power reception device 20, to the power reception device 20. Here, the ID 311 in the frame format is used.

In step S202, the power transmission device 10 receives the device ID 3210 from the power reception device 20 (reception processing). Here, the ID 311 in the frame format is used. In step S203, the power transmission device 10 checks if the power reception device 20 needs power. Here, the power management 3120 in the frame format is used.

In step S204, if the power reception device 20 needs electric power, the power reception device 20 notifies the power transmission device 10 that the power reception device 20 needs electric power. Here, the power management 3120 in the frame format is used.

Further, in step S204, if the power reception device 20 does not need electric power, the power reception device 20 notifies the power transmission device 10 that the power reception device 20 does not need electric power. Here, the power management 3120 in the frame format is used.

Then, the power transmission device 10 determines the power reception device 20 as a power transmission object, based on the response result regarding the necessity of power supply. It should be noted that the power transmission device 10 of the present embodiment is capable of transmitting power to the plurality of power reception devices 20 simultaneously, and the plurality of power reception devices 20 are determined as power transmission objects.

Figure 9:
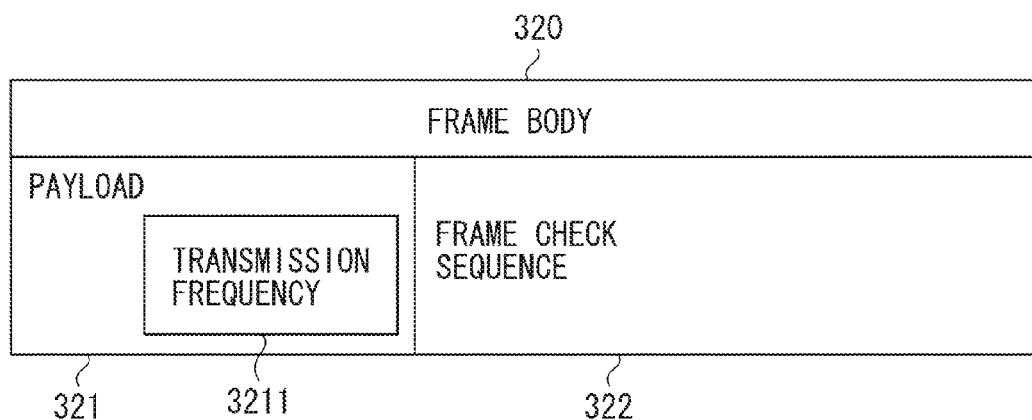
FIG. 9 illustrates an exemplary frame.

In step S205, the power transmission device 10 prepares transmission of power. More specifically, the power transmission device 10 transmits a request for transmission frequencies to the power reception devices 20 as power transmission objects, and receives transmission frequencies from the power reception devices 20 as power transmission objects (reception processing). FIG. 9 illustrates an exemplary frame for transmission of a transmission frequency 3211. As illustrated in FIG. 9, the transmission frequency 3211 is written in the payload 321 so as to be transmitted.

Based on the device IDs, the power transmission device 10 authenticates each power reception device 20 as a power transmission object. Authentication processing would be described below, with reference to FIG. 10.

In step S206, the power transmission device 10 transmits electric power to each power reception device 20 as a power transmission object (power transmission processing). In step S207, when the battery is fully charged, the power reception device 20 transmits to the power transmission device 10 a notification that electric power transmission is completed. Here, the power management 3120 in the frame format is used.

Through the above-described processes, one superframe is completed. In this way, by performing data transmission/reception processing in the superframe, data communication for wireless power supply is achieved.

FIG. 10 is a flowchart that illustrates authentication processing by the power transmission device 10. The authentication processing is executed in the power transmission preparation period, after the power reception devices 20 as power transmission objects are determined. In the authentication processing, the power transmission device 10 authenticates the power reception devices 20 based on the device IDs received from the power reception devices 20 as power transmission objects.

As the premise for the authentication processing, the power transmission device 10 has a device ID list. The device ID list stores device IDs of registered devices. Here, the registered device is a power reception device 20 to which the power transmission device 10 can transmit power. The device ID list is, for example, stored in a storage unit such as the RAM 113 beforehand. The power transmission device 10 refers to the device ID list, and limits power transmission to devices other than the registered devices.

In step S301, the CPU 111 of the power transmission device 10 determines whether each of a plurality of power reception devices as power transmission objects is a registered device (device determination processing). More specifically, the CPU 111 compares each of a plurality of device IDs that the CPU 111 receives from the respective power reception devices 20 as power transmission objects with the device IDs registered in the device ID list.

In step S301, in a case where all of the device IDs received are included in the device ID list, that is, in a case where all of the power transmission objects are registered devices (YES in Step S301), the CPU 111 proceeds the processing to step S305.

In step S305, the CPU 111 sets the transmission frequencies received from the plurality of power reception devices 20 as power transmission objects as the frequencies used for power transmission, respectively. Then, the authentication processing is completed.

When the authentication processing is completed, the CPU 111 starts the processing during the power transmission period (S103). It should be noted that, in the power transmission period (S103), the CPU 111 instructs the start of power transmission to the respective power reception devices 20.

This causes the power transmission device 10 to perform power transmission from the plurality of radio transmission units 120 to the power reception devices 20 as power transmission objects simultaneously.

On the other hand, in step S301, in a case where at least one device ID among the received device IDs does not coincide with any device ID registered in the device ID list (NO in step S301), the CPU 111 proceeds the processing to step S302. It should be noted that the case where at least one device ID among the received device IDs does not coincide with any device ID registered in the device ID list refers to a case where a device other than the registered devices, i.e., a non-registered device, is included in the power transmission objects.

In step S302, the CPU 111 determines whether the transmission frequency of the power reception device 20 as a power transmission object coincides with the transmission frequency received from the non-registered device. In step S302, in a case where the transmission frequency of the power reception device 20 as a power transmission object coincides with the transmission frequency of the non-registered device (YES in Step S302), the CPU 111 proceeds the processing to step S303. On the other hand, in step S302, in a case where the transmission frequency of the power reception device 20 as a power transmission object does not coincide with the transmission frequency of the non-registered device (NO in step S302), the CPU 111 proceeds the processing to step S305. In step S305, the CPU 111 sets the transmission frequency of the power transmission object as a frequency used for power transmission.

In step S303, the CPU 111 determines whether the transmission frequency that coincides with the transmission frequency of the non-registered device is changeable to another frequency (changeability determination processing). More specifically, the CPU 111 inquires of the power reception device 20 as a power transmission object whether power transmission can be performed at any frequency other than the transmission frequency already received. Then, in a case where the CPU 111 receives, as a transmission frequency, another frequency which is different from the transmission frequency of the non-registered device, the CPU 111 determines that the transmission frequency is changeable to the another frequency.

In step S303, in a case where it is determined to be changeable (YES in step S303), the CPU 111 proceeds the processing to step S304. In step S304, the CPU 111 changes the transmission frequency of the power reception device 20 as a power transmission object to a frequency different from that of the non-registered device (changing processing). Then, the CPU 111 proceeds the processing to step S305. In step S305, the CPU 111 sets the frequency obtained after the change as a frequency used for power transmission.

On the other hand, in step S303, in a case where it is determine to be not changeable (NO in step S303), the CPU 111 proceeds the processing to step S306. In step S306, the CPU 111 stops power transmission (stop processing), whereby the authentication processing is completed. It should be noted that, in this case, the superframe under execution ends without the processing of the power transmission period.

As has been described above, in the wireless power supply system according to the present embodiment, in a case where non-registered devices are included in power transmission objects, electric power is supplied at a frequency other than the transmission frequencies of the non-registered devices. Further, the power transmission device 10 stops power transmission in a case where power transmission cannot be performed at a frequency other than the transmission frequencies of the non-registered devices. This enables the power transmission device 10 to prevent electric power from being supplied to devices that are not assumed as power transmission objects.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-102424 filed May 14, 2013, which is hereby incorporated by reference herein in its entirety.

What is claimed is:

1. A power transmission device that transmits power wirelessly to an external device, the power transmission device comprising:
   a reception unit configured to receive, from a power reception device, identification information of the power reception device and frequency information indicating a first transmission frequency that is suitable for the power reception device;
   a first determination unit configured to determine whether the identification information is registered in the power transmission device, as information of an external device to which the power transmission device can transmit power;

a second determination unit configured to determine whether the first transmission frequency indicated by the frequency information coincides with a second transmission frequency used for transmitting power to another power reception device, if the first determination unit determines that the identification information is not registered in the power transmission device; and a changing unit configured to change the second transmission frequency, if the second determination unit determines that the first transmission frequency coincides with the second transmission frequency.

2. The power transmission device according to claim 1, further comprising:

a change determination unit configured to determine, if the second determination unit determines that the first transmission frequency coincides with the second transmission frequency, whether the second transmission frequency can be changed; and a stop unit configured to stop transmitting power, if the change determination unit determines that the second transmission frequency cannot be changed, wherein the changing unit changes the second transmission frequency, if the change determination unit determines that the second transmission frequency can be changed.

3. The power transmission device according to claim 2, wherein the change determination unit determines that the second transmission frequency can be changed, if the another power reception device corresponds with another transmission frequency that is different from the second transmission frequency; and the changing unit changes the second transmission frequency to the another transmission frequency.

4. A power transmission method that transmits power wirelessly to an external device, executed by a power transmission device, the method comprising:

receiving, from a power reception device, identification information of the power reception device and frequency information indicating a first transmission frequency that is suitable for the power reception device;

determining whether the identification information is registered in the power transmission device, as information of an external device to which the power transmission device can transmit power;

determining whether the first transmission frequency indicated by the frequency information coincides with a second transmission frequency used for transmitting power to another power reception device, if determining that the identification information is not registered in the power transmission device; and changing the second transmission frequency, if determining that the first transmission frequency coincides with the second transmission frequency.

5. A non-transitory computer-readable storage medium for storing computer executable instructions that cause a computer to execute a method that transmits power wirelessly to an external device, the method comprising:

receiving, from a power reception device, identification information of the power reception device and frequency information indicating a first transmission frequency that is suitable for the power reception device;

determining whether the identification information is registered in the power transmission device, as information of an external device to which the power transmission device can transmit power;

determining whether the first transmission frequency indicated by the frequency information coincides with a second transmission frequency used for transmitting power to another power reception device, if determining that the identification information is not registered in the power transmission device; and changing the second transmission frequency, if determining that the first transmission frequency coincides with the second transmission frequency.

\* \* \* \* \*